(12) United States Patent
Fujimoto et al.

(10) Patent No.: US 12,300,107 B2
(45) Date of Patent: May 13, 2025

(54) REPORTING DEVICE, VEHICLE, AND REPORTING CONTROL METHOD

(71) Applicant: HONDA MOTOR CO., LTD., Tokyo (JP)

(72) Inventors: Naotoshi Fujimoto, Wako (JP); Ryo Shimoe, Wako (JP); Junichi Sakamoto, Wako (JP); Masaki Maruyama, Wako (JP); Takeru Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 17/985,548

(22) Filed: Nov. 11, 2022

(65) Prior Publication Data

US 2023/0162609 A1 May 25, 2023

(30) Foreign Application Priority Data

Nov. 22, 2021 (JP) .................................. 2021-189595

(51) Int. Cl.
*G08G 1/16* (2006.01)
*B60Q 9/00* (2006.01)
(Continued)

(52) U.S. Cl.
CPC .............. *G08G 1/16* (2013.01); *B60Q 9/008* (2013.01); *G06V 20/58* (2022.01); *G06V 20/597* (2022.01)

(58) Field of Classification Search
CPC .......... G08G 1/16; G08G 1/167; G08G 1/166; B60Q 9/008; G06V 20/58; G06V 20/597; G06V 10/143; B60W 2540/12; B60W 2540/225; B60W 2554/4041; B60W 2554/802; B60W 50/14; B60W 2420/52; B60W 2552/50; B60W 2554/402
See application file for complete search history.

(56) References Cited

U.S. PATENT DOCUMENTS

| 11,390,297 B2 | 7/2022 | Maruyama et al. |
| 2003/0156019 A1* | 8/2003 | Lehmann .............. G01S 13/931 340/691.2 |
| 2020/0385012 A1* | 12/2020 | Maruyama ........... G06V 20/597 |

FOREIGN PATENT DOCUMENTS

| EP | 1038734 A1 * | 9/2000 | ............... B60R 1/00 |
| JP | 11-42988 A | 2/1999 | |

(Continued)

OTHER PUBLICATIONS

Office Action dated Jun. 19, 2023, counterpart JP Application No. 2021-189595, with English translation. (10 pages).

*Primary Examiner* — Daryl C Pope
(74) *Attorney, Agent, or Firm* — WHDA, LLP

(57) ABSTRACT

A reporting device mounted on a vehicle, comprises: a recognition processing unit configured to recognize an obstacle existing in front of the vehicle on the basis of information detected by a front detection unit and a risk target existing at least diagonally behind the vehicle on the basis of information detected by a rear detection unit; a sight line monitoring unit configured to determine whether or not a driver recognizes the obstacle or the risk target on the basis of an overlap between a sight line of the driver acquired on the basis of a captured image of the driver and the obstacle or the risk target; and a reporting control unit configured to report the existence of the obstacle or the risk target.

11 Claims, 6 Drawing Sheets

(51) Int. Cl.
*G06V 20/58* (2022.01)
*G06V 20/59* (2022.01)

(56) References Cited

FOREIGN PATENT DOCUMENTS

| | | |
|---|---|---|
| JP | 2003-291689 A | 10/2003 |
| JP | 2010-134838 A | 6/2010 |
| JP | 2017-194822 A | 10/2017 |
| JP | 2020-201670 A | 12/2020 |
| JP | 2021-039554 A | 3/2021 |

* cited by examiner

REPORTING DEVICE, VEHICLE, AND REPORTING CONTROL METHOD

CROSS-REFERENCE TO RELATED APPLICATION(S)

This application claims priority to and the benefit of Japanese Patent Application No. 2021-189595 filed on Nov. 22, 2021, the entire disclosure of which is incorporated herein by reference.

BACKGROUND OF THE INVENTION

Field of the Invention

The present invention relates to a reporting device, a vehicle, and a reporting control method.

Description of the Related Art

Japanese Patent Laid-Open No. 2003-291689 discloses technology for detecting other vehicles or obstacles around a self-vehicle, determining a risk, and outputting an alarm signal. In addition, Japanese Patent Laid-Open No. 11-042988 discloses technology for outputting an alarm sound from a direction with a high degree of risk when other vehicles or following vehicles traveling in an adjacent lane approach a self-vehicle and a degree of risk increases on the basis of a relative position with respect to the self-vehicle.

However, in the configurations disclosed in Japanese Patent Laid-Open No. 2003-291689 and Japanese Patent Laid-Open No. 11-042988, the existence of another vehicle approaching the self-vehicle from the rear or the side is reported, and the reporting frequency may be increased depending on a traffic condition, which results in causing the driver to feel annoyed or affecting the recognition of a particularly important risk.

In view of the above problems, the present invention provides reporting technology capable of reporting a risk that a driver does not recognize from the viewpoint of improving traffic safety.

SUMMARY OF THE INVENTION

According to one aspect of the present invention, there is provided a reporting device mounted on a vehicle, comprising: a recognition processing unit configured to recognize an obstacle existing in front of the vehicle on the basis of information detected by a front detection unit and a risk target existing at least diagonally behind the vehicle on the basis of information detected by a rear detection unit; a sight line monitoring unit configured to determine whether or not a driver recognizes the obstacle or the risk target on the basis of an overlap between a sight line of the driver acquired on the basis of a captured image of the driver and the obstacle or the risk target; and a reporting control unit configured to report the existence of the obstacle or the risk target, wherein the reporting control unit performs the reporting when the driver does not recognize the obstacle or the risk target on the basis of the determination of the sight line monitoring unit.

DESCRIPTION OF THE EMBODIMENTS

Figure 1:
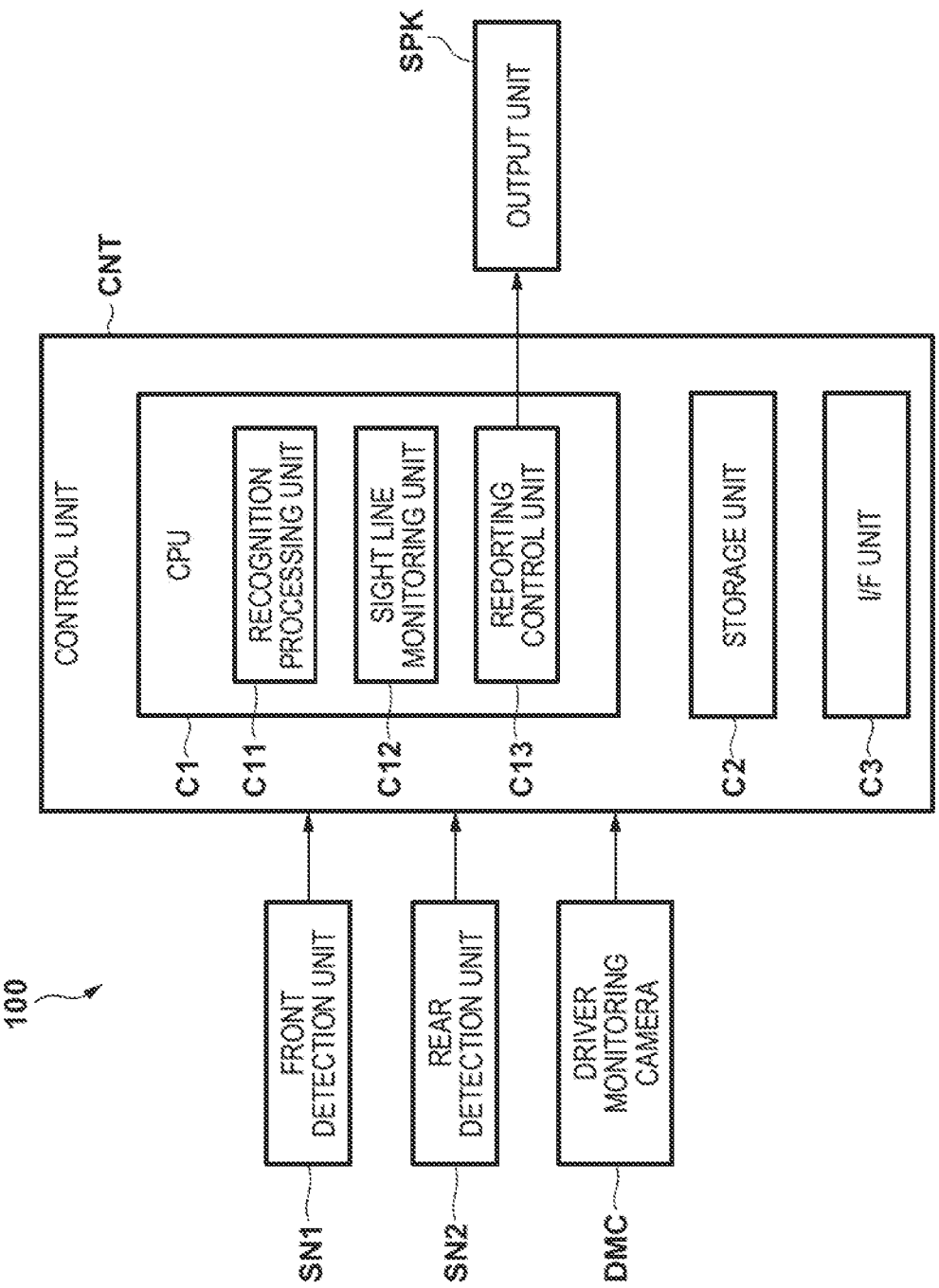
FIG. 1 is a diagram illustrating a basic configuration of a reporting device.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment (Basic Configuration of Reporting Device)

FIG. 1 is a diagram illustrating a basic configuration of a reporting device 100 mounted on a vehicle, and the reporting device 100 includes a front detection unit SN1, a rear detection unit SN2, a driver monitoring camera DMC, a control unit CNT, and an output unit SPK. The front detection unit SN1 detects an obstacle existing at least in front of the vehicle (self-vehicle). The rear detection unit SN2 detects a risk target existing at least diagonally behind or beside the vehicle. Here, the obstacle includes, for example, a stopping vehicle located in front of the vehicle (self-vehicle), a person, a lane decrease, and the like, which may cause a lane change by the traveling vehicle (self-vehicle). The risk target includes a dynamic target (for example, various moving objects such as a two-wheeled vehicle and a four-wheeled vehicle traveling at least diagonally behind or beside the self-vehicle in an adjacent lane in which the self-vehicle travels) that moves as time passes.

The driver monitoring camera DMC is disposed in a vehicle interior and captures an image of an appearance of the driver. The driver monitoring camera DMC captures a face image of the driver, and inputs image information regarding the captured face image of the driver to the control unit CNT.

The control unit CNT includes a CPU (C1: Central Processing Unit) that performs processing regarding the reporting device 100, a storage unit C2 such as a hard disk drive (HDD), an interface unit (I/F unit C3), and the like. The storage unit C2 stores programs executed by the CPU (C1) of the control unit CNT, data used for processing by the CPU (C1), and the like. In addition, the storage unit C2 stores a stereophonic sound (sound source file) used at the time of reporting processing. The storage unit C2 can store a plurality of stereophonic sounds (sound source files) corresponding to a direction of reporting.

The interface unit (I/F unit C3) can acquire information by communication with an external device, and can acquire sensor information recognized by various sensors provided in the vehicle. Here, the sensor information includes, for example, information regarding a braking operation of the driver detected by an operation detection sensor provided on a brake pedal, information regarding a blinker operation at the time of changing a lane or the like, information regarding a steering operation of the driver on a steering wheel, and the like.

The CPU (C1) executes a reporting control program stored in the storage unit C2 to function as a recognition processing unit C11, a sight line monitoring unit C12, and a reporting control unit C13 as functional configurations that perform the reporting processing of the present embodiment. The CPU (C1) determines an operation state (for example, a braking operation, a steering angle operation, a lane change operation, and the like by the driver) of the vehicle on the basis of the sensor information acquired by the interface unit (I/F unit C3), and controls the reporting processing on the basis of a determination result.

The recognition processing unit C11 recognizes (acquires) an obstacle or a risk target existing around the self-vehicle by image processing based on information detected by the front detection unit SN1 or the rear detection unit SN2. In addition, the recognition processing unit C11 acquires a relative distance between the acquired obstacle or risk target and the vehicle (self-vehicle).

In addition, the sight line monitoring unit C12 can acquire appearance information of the driver such as a direction of a face, a sight line, and a driving posture of the driver by performing image processing of a face image of the driver (a captured image of the driver) input from the driver monitoring camera DMC.

When a state in which the sight line of the driver overlaps the obstacle recognized (acquired) on the basis of the information of the front detection unit SN1 is detected, the sight line monitoring unit C12 determines that the driver has recognized the obstacle. On the other hand, when the sight line of the driver does not overlap the obstacle recognized (acquired) on the basis of the information of the front detection unit SN1, the sight line monitoring unit C12 determines that the driver does not recognize the obstacle.

The sight line monitoring unit C12 can obtain the sight line of the driver directed to the side or the diagonal rear of the vehicle 200 (self-vehicle) on the basis of the appearance information of the driver such as the direction of the face of the driver or the sight line directed to a door mirror or a rearview mirror acquired by the image processing.

When a state in which the sight line of the driver overlaps the risk target recognized (acquired) on the basis of the information of the rear detection unit SN2 is detected by the determination processing using the appearance information of the driver, the sight line monitoring unit C12 determines that the driver has recognized the risk target. On the other hand, when the sight line of the driver does not overlap the risk target recognized (acquired) on the basis of the information of the rear detection unit SN2, the sight line monitoring unit C12 determines that the driver does not recognize the risk target.

The reporting control unit C13 causes the output unit SPK to output a reporting sound for reporting the existence of the obstacle or the risk target to the driver, on the basis of the determination result of the sight line monitoring unit C12. A specific flow of processing in the reporting device 100 will be described with reference to FIG. 3.

(Arrangement Example of Reporting Device 100)

Figure 2:
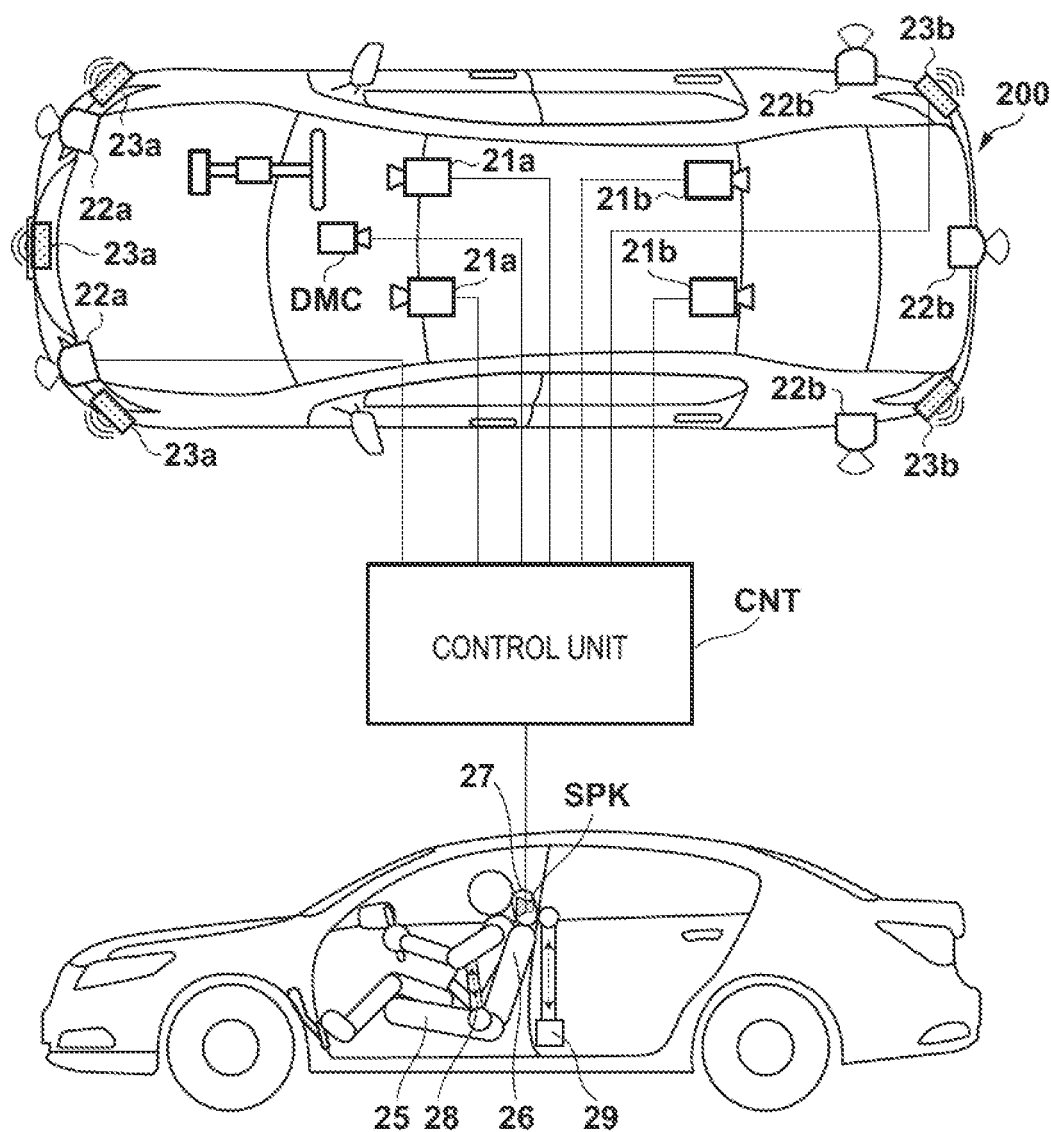
FIG. 2 is a diagram illustrating an arrangement example of the reporting device mounted on a vehicle.

FIG. 2 is a diagram illustrating an arrangement example of the reporting device 100 mounted on the vehicle 200. The front detection unit SN1 includes, for example, a camera unit 21a, a LiDAR detection unit 22a, and a radar detection unit 23a. The rear detection unit SN2 includes, for example, a camera unit 21b, a LiDAR detection unit 22b, and a radar detection unit 23b. Note that the configuration examples of the front detection unit SN1 and the rear detection unit SN2 are exemplary, and at least the front detection unit SN1 and the rear detection unit SN2 may have the camera unit 21a and the camera unit 21b.

The camera units 21a and 21b are imaging devices that detect objects around the vehicle 200 by imaging. The camera unit 21a constituting the front detection unit SN1 is attached to the vehicle interior side of a windshield in a front portion of a roof of the vehicle 200 so as to be able to capture an image of the front of the vehicle 200. Similarly, the camera unit 21b constituting the rear detection unit SN2 is attached to the vehicle interior side of a rear window in a rear portion of the roof of the vehicle 200 so as to be able to capture an image of the rear of the vehicle 200. Note that the attachment positions of the camera units 21a and 21b are exemplary, and are not limited to the positions illustrated in FIG. 2. By analyzing the images captured by the camera units 21a and 21b, it is possible to acquire an outline of an obstacle existing in front of the vehicle 200 or to acquire a division line (white line or the like) of a lane on a road.

The LiDAR detection units 22a and 22b are, for example, Light Detection and Ranging (LiDAR), and detect a target (an obstacle and a risk target) around the vehicle 200 by light. A distance to the target (the obstacle and the risk target) can be measured by analyzing the information detected by the LiDAR detection units 22a and 22b. The LiDAR detection units 22a constituting the front detection unit SN1 are provided, for example, one at each corner of the front portion of the vehicle 200, and the LiDAR detection units 22b constituting the rear detection unit SN2 are provided, for example, one at the center of the rear portion and one at each side of the rear portion.

The radar detection units 23a and 23b are, for example, millimeter wave radars, and detect the target (the obstacle and the risk target) around the vehicle 200 by radio waves. The distance to the target (the obstacle and the risk target) can be measured by analyzing the information detected by the radar detection units 23a and 23b. The radar detection units 23a constituting the front detection unit SN1 are provided, for example, one at the center of the front portion of the vehicle 200 and one at each corner, and the radar detection units 23b constituting the rear detection unit SN2 are provided, for example, one at each corner of the rear portion.

The output unit SPK can be provided, for example, in a headrest 27 of a seat 25 (driver seat) on which the driver sits. The output unit SPK includes, for example, a speaker system capable of outputting a stereophonic sound, and the reporting control unit C13 outputs the stereophonic sound (sound source file) stored in the storage unit C2 to the output unit SPK at predetermined reporting timing. The output unit SPK reproduces the stereophonic sound (sound source file) input from the reporting control unit C13, outputs the reproduced sound as the stereophonic sound, and reports a direction in which the obstacle or the risk target exists to the driver. Further, the stereophonic sound is not limited to the sound source file stored in the storage unit C2, and for example, an external environmental sound including a traveling sound or the like emitted by the obstacle or the risk target may be collected by a microphone (not illustrated) mounted on the vehicle 200 and output as the stereophonic sound. That is, the reporting control unit C13 may output the external environmental sound including the traveling sound and the like collected by the microphone to the output unit SPK, and the output unit SPK may output the external environmental sound input from the reporting control unit C13 as the stereophonic sound.

Note that the arrangement position of the output unit SPK is not limited to the headrest 27, and for example, the output unit SPK may be disposed on a backrest portion 26 (a position near a shoulder of the driver) of the seat 25 on which the driver sits.

In addition, the output unit SPK may be an acoustic device having a communication unit capable of communicating with the control unit CNT. The control unit CNT and the communication unit of the acoustic device may support short-range radio communication such as Bluetooth (registered trademark).

The acoustic device may be, for example, an audio player that can be carried by the driver or a wearable terminal device (for example, earphones, glasses incorporating a speaker, and the like) that can be worn by the driver. The output unit SPK disposed in the headrest 27 and the wearable terminal device that can be worn by the driver may be combined to report a direction in which the obstacle or the risk target exists.

In addition, the reporting control unit C13 may cause a vibration generation unit 29 such as a vibrator to vibrate a seat belt 28 of the seat 25 (driver seat) and call the driver's attention regarding the reporting.

(Processing of Reporting Device 100)

Figure 3:
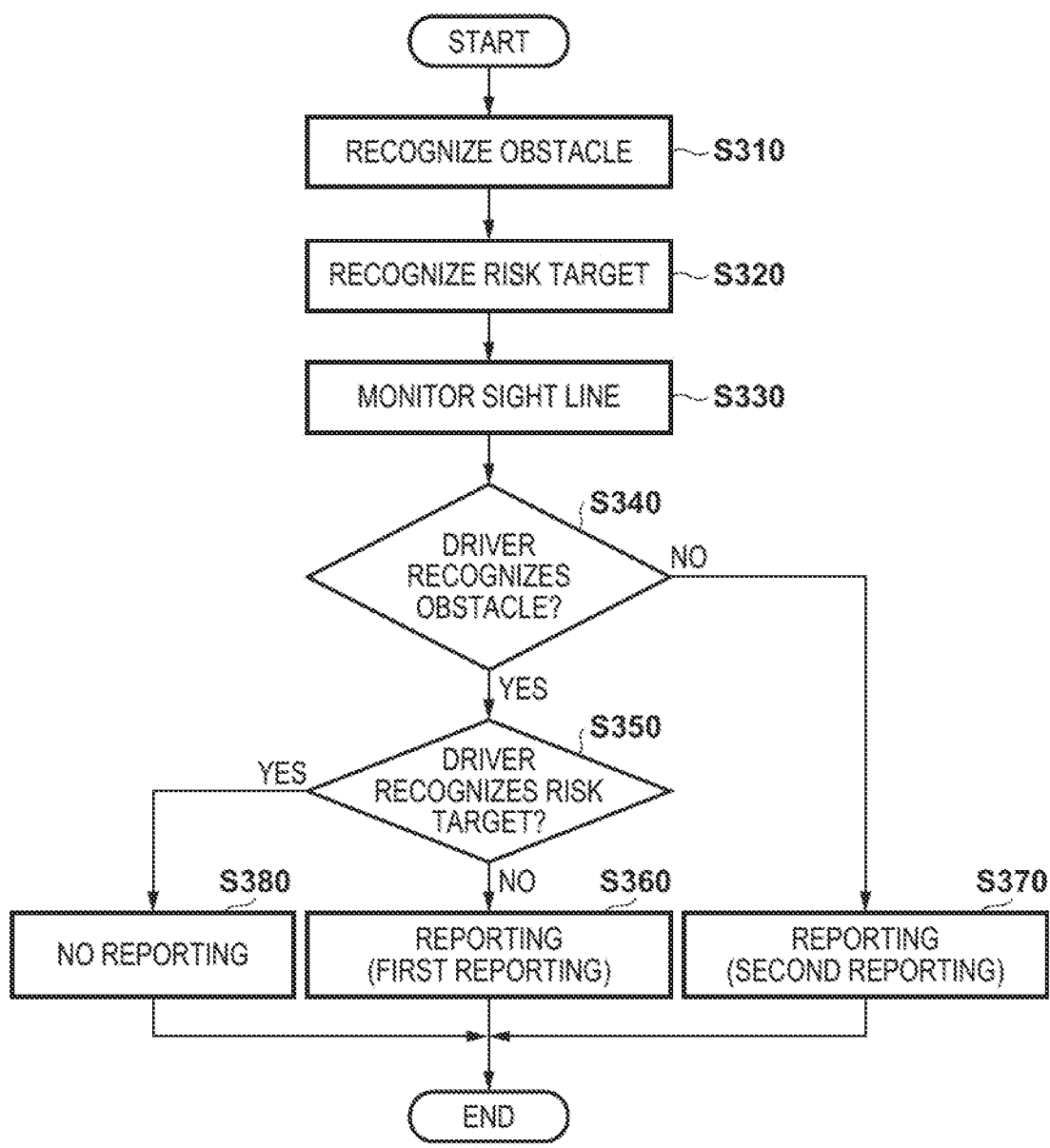
FIG. 3 is a flowchart illustrating a flow of processing of the reporting device.
Figure 4:
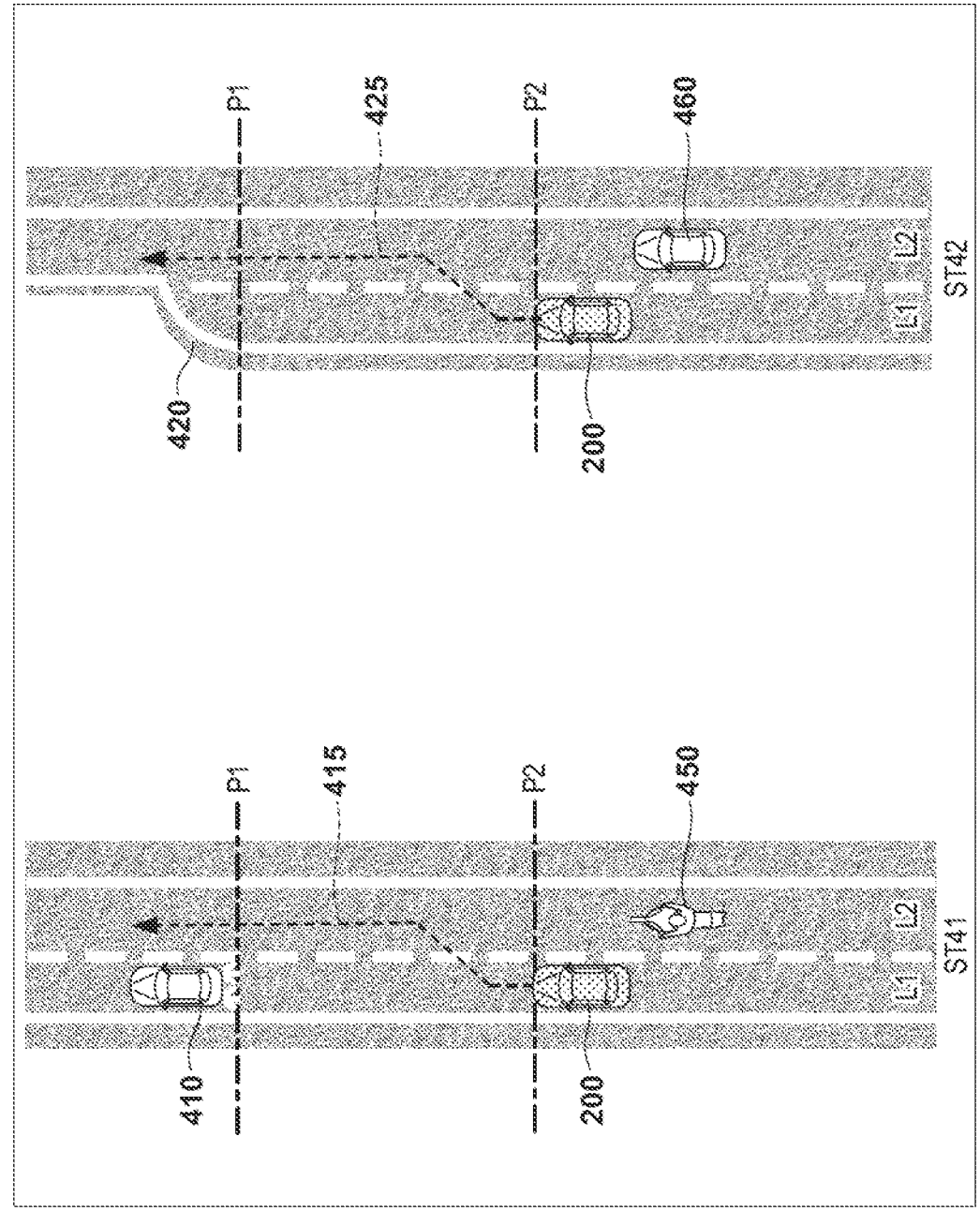
FIG. 4 is a diagram schematically illustrating a processing example of the reporting device.

Next, a flow of processing of the reporting device 100 of the present embodiment will be described. FIG. 3 is a flowchart illustrating a flow of processing of the reporting device 100, and FIG. 4 is a diagram schematically illustrating a processing example of the reporting device 100. In ST41 of FIG. 4, a state is illustrated in which the vehicle 200 (self-vehicle) is traveling on a left lane L1 of a road having two lanes on each side. A state is illustrated in which a stopped vehicle as an obstacle 410 recognized (acquired) on the basis of the information of the front detection unit SN1 exists in front of the vehicle 200, and the vehicle 200 needs to change the lane from the left lane L1 to the right lane L2 as indicated by a broken line 415. In ST41, a two-wheeled vehicle as a risk target 450 recognized (acquired) on the basis of the information of the rear detection unit SN2 exists diagonally behind the vehicle 200.

ST42 in FIG. 4 illustrates a modification of ST41, and illustrates a state in which the lane L1 merges with the lane L2 and the number of lanes decreases from two lanes to one lane, as an obstacle 420 recognized on the basis of the information of the front detection unit SN1. In ST42, a state is illustrated in which the vehicle 200 needs to change the lane from the left lane L1 to the right lane L2 as indicated by a broken line 425. In ST42, a four-wheeled vehicle as a risk target 460 recognized on the basis of the information of the rear detection unit SN2 exists diagonally behind the vehicle 200. In the flowchart of FIG. 3, the flow of the processing of the reporting device 100 will be described with reference to the state of ST41 or ST42 of FIG. 4.

In step S310, the front detection unit SN1 detects an obstacle located in front of the vehicle 200 (for example, the obstacle 410 (stopped vehicle) and the obstacle 420 (lane decrease portion) in FIG. 4), and the recognition processing unit C11 recognizes (acquires) an obstacle existing around the vehicle 200 by the image processing based on the information detected by the front detection unit SN1.

In step S320, the rear detection unit SN2 detects a risk target (for example, the risk target 450 (two-wheeled vehicle) and the risk target 460 (four-wheeled vehicle) in FIG. 4) located beside or diagonally behind the vehicle 200, and the recognition processing unit C11 recognizes (acquires) the risk target existing around the vehicle 200 by the image processing based on the information detected by the rear detection unit SN2.

In step S330, the driver monitoring camera DMC captures a face image of the driver, and inputs image information regarding the captured face image of the driver to the control unit CNT. The sight line monitoring unit C12 performs image processing on the face image of the driver input from the driver monitoring camera DMC and acquires appearance information of the driver such as the direction of the face, the sight line, and the driving posture of the driver.

In step S340, the sight line monitoring unit C12 determines whether or not a state in which the sight line of the driver overlaps the obstacle recognized on the basis of the information of the front detection unit SN1 has been detected. When the state in which the sight line of the driver overlaps the obstacle is detected, the sight line monitoring unit C12 determines that the driver has recognized the obstacle (S340-YES), and causes the process to proceed to step S350.

On the other hand, when the sight line of the driver does not overlap the obstacle in the determination processing of step S340, the sight line monitoring unit C12 determines that the driver does not recognize the obstacle (S340-NO), and causes the process to proceed to step S370.

In the present step, when it is determined on the basis of the determination of the sight line monitoring unit C12 that the driver does not recognize the obstacle, the reporting control unit C13 performs reporting (second reporting) at a reporting level higher than a reporting level of the reporting (first reporting) in step S360. In this case, for example, as indicated by ST41 and ST42 in FIG. 4, the obstacles 410 and 420 existing in front of the lane L1 on which the vehicle 200 (self-vehicle) is traveling are approaching, and reporting with higher urgency is required as compared with reporting (first reporting in step S360) of the existence of the risk targets 450 and 460 existing diagonally behind the vehicle 200. In the reporting (second reporting) in step S370, the reporting control unit C13 performs control to perform the second reporting at a reporting level (reporting intensity) higher than the reporting level in the reporting (first reporting) in step S360. For example, a volume of the reporting sound output from the output unit SPK may be increased, or a vibration level of the vibration generation unit 29 may be increased. The reporting may be performed by combining the reporting sound from the output unit SPK and the vibration of the vibration generation unit 29.

In step S350, the sight line monitoring unit C12 determines whether or not a state in which the sight line of the driver overlaps the risk target recognized (acquired) on the basis of the information of the rear detection unit SN2 has been detected by using the appearance information of the driver such as the direction of the face of the driver and the sight line of the driver directed to the door mirror or the rearview mirror. When the sight line of the driver does not overlap the risk target recognized (acquired) on the basis of the information of the rear detection unit SN2, the sight line monitoring unit C12 determines that the driver does not recognize the risk target (S350-NO), and causes the process to proceed to step S360.

In step S360, the reporting control unit C13 causes the output unit SPK to output a reporting sound to report (first reporting) the existence of the risk targets 450 and 460 to the driver, on the basis of the determination result in step S350. That is, when, on the basis of the determination of the sight line monitoring unit C12, the driver recognizes the obstacle and the driver does not recognize the risk target, the reporting control unit C13 causes the output unit SPK to output the reporting sound and performs reporting on the driver.

On the other hand, when a state in which the sight line of the driver overlaps the risk target is detected in the determination in step S350, the sight line monitoring unit C12 determines that the driver has recognized the risk target (S350-YES), and causes the process to proceed to step S380.

In the state of step S380, the driver recognizes the obstacles 410 and 420 (S340-YES), and the driver recognizes the risk targets 450 and 460 (S350-YES). In this state, the reporting control unit C13 does not perform reporting in order to suppress complicated reporting. That is, the reporting control unit C13 does not perform reporting when the driver recognizes the obstacle as well as the risk target on the basis of the determination of the sight line monitoring unit C12.

According to the present embodiment, it is possible to provide reporting technology capable of reporting a risk not recognized by the driver from the viewpoint of improving traffic safety while suppressing reporting of a risk recognized by the driver.

Second Embodiment

Figure 5:
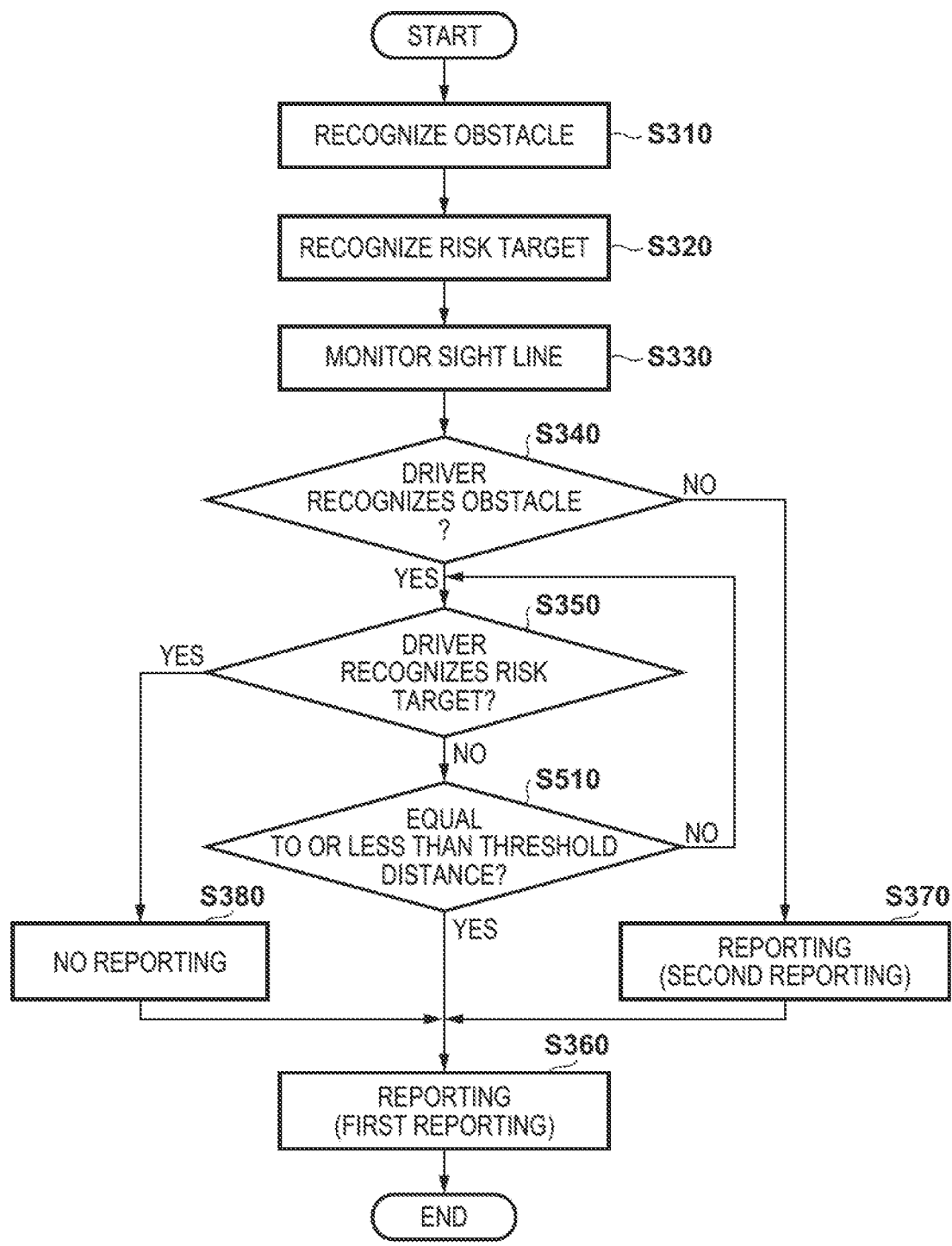
FIG. 5 is a flowchart illustrating a flow of processing of a reporting device according to a second embodiment.

Next, processing of a reporting device 100 in a second embodiment will be described. FIG. 5 is a flowchart illustrating a flow of processing of the reporting device 100, and the same processes as those in the flowchart described in FIG. 3 are denoted by the same step numbers, and description thereof is omitted. The flowchart of FIG. 5 is different from the processing of FIG. 3 of the first embodiment in that processing of step S510 is added after processing of step S350-NO and before reporting is performed in step S360.

In step S510, a reporting control unit C13 acquires a relative distance between a position P2 of a vehicle 200 (self-vehicle) and P1 of a front obstacle (for example, obstacles 410 and 420 in FIG. 4) from a recognition processing unit C11. Then, the reporting control unit C13 determines whether or not the acquired relative distance is equal to or less than a threshold distance. When the relative distance is larger than the threshold distance (S510-NO), the process returns to step S350, and the determination processing in steps S350 and S510 is similarly repeated. Here, the state in which the relative distance is larger than the threshold distance is a state in which there is still a margin in terms of distance from the viewpoint of conflicting with the front obstacle. In this state, the driver recognizes the existence of the risk target (S350-YES) before the reporting device 100 performs the reporting, and the operation of avoiding the conflict with the risk target is high. Therefore, until the relative distance becomes equal to or less than the threshold distance (S510-YES), the reporting control unit C13 performs control so as not to output the reporting sound from the output unit SPK.

When the relative distance is equal to or less than the threshold distance in the determination processing of step S510 (S510-YES), the process proceeds to step S360, and the reporting control unit C13 causes the output unit SPK to output a reporting sound to report the existence of the risk targets 450 and 460 to the driver on the basis of the determination result of step S350.

According to the present embodiment, it is possible to provide reporting technology capable of reporting a risk not recognized by the driver from the viewpoint of improving traffic safety while suppressing reporting of a risk recognized by the driver.

(First Modification)

When a state in which the sight line of the driver overlaps the risk target is detected after the reporting (S360) described in the first embodiment and the second embodiment, the sight line monitoring unit C12 may determine that the driver has recognized the risk target, and the reporting control unit C13 may perform control so that the reporting (third reporting) is performed at a reporting level (for example, the reporting intensity such as the volume of the reporting sound) lower than the reporting level in the reporting (first reporting) in step S360 on the basis of the determination result of the sight line monitoring unit C12. Note that the present example is not limited to the reporting (third reporting) at the low reporting level (reporting intensity), and the reporting control unit C13 may perform control to stop the output of the reporting sound from the output unit SPK when the sight line monitoring unit C12 determines that the driver has recognized the risk target. According to the present example, it is possible to report a risk not recognized by the driver from the viewpoint of improving traffic safety while suppressing the reporting level of the risk recognized by the driver.

(Second Modification)

After the reporting (S360) described in the first embodiment and the second embodiment, when the interface unit C3 (I/F unit) acquires the information regarding the braking operation of the driver, the reporting control unit C13 may perform control so that the reporting (third reporting) is performed at a reporting level (for example, the reporting intensity such as the volume of the reporting sound) lower than the reporting level in the reporting (first reporting) in step S360. Note that the present example is not limited to the reporting (third reporting) at the low reporting level (reporting intensity), and the reporting control unit C13 may perform control to stop the output of the reporting sound from the output unit SPK when the information regarding the braking operation of the driver is acquired.

In addition, as described in the first modification, when the interface unit C3 (I/F unit) acquires the information regarding the braking operation of the driver after the reporting (third reporting), the reporting control unit C13 may perform control to perform reporting (fourth reporting) at a reporting level (reporting intensity) lower than the reporting level in the reporting (third reporting). According to the present example, it is possible to report a risk not recognized by the driver from the viewpoint of improving traffic safety while suppressing the reporting level of the risk recognized by the driver.

(Third Modification)

Figure 6:
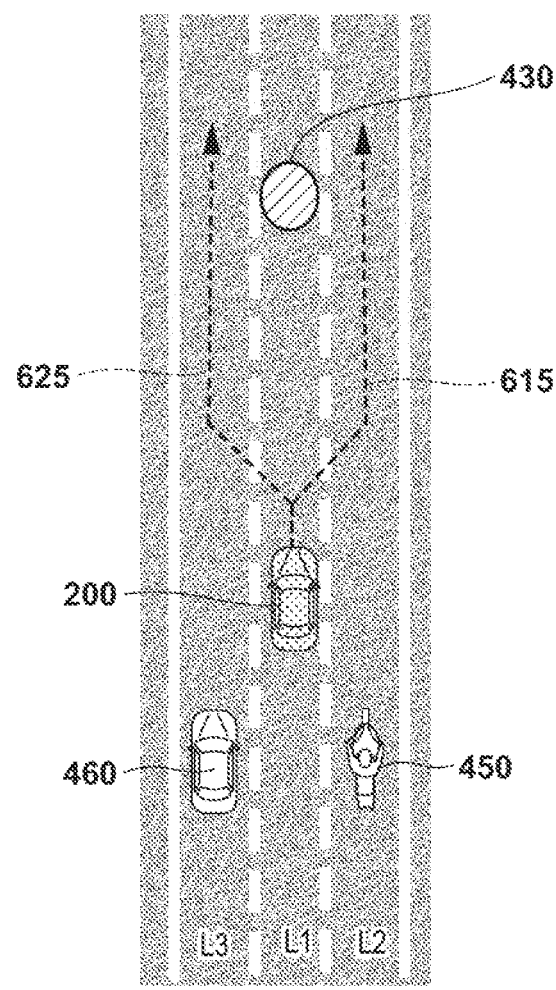
FIG. 6 is a diagram schematically illustrating a modification of reporting processing.

FIG. 6 is a diagram schematically illustrating a third modification of the reporting processing, and illustrates a state in which the vehicle 200 (self-vehicle) is traveling in a center lane L1 of a road having three lanes on each side. In front of the vehicle 200, there is an obstacle 430 (on-road dropped object) recognized (acquired) on the basis of the information of the front detection unit SN1. A two-wheeled vehicle exists as a risk target 450 in the lane L2 on the right side of the traveling lane L1 of the vehicle 200 (self-vehicle), and a four-wheeled vehicle exists as a risk target 460 in the lane L3 on the left side of the traveling lane L1. In the state illustrated in FIG. 6, even when a lane change is made as indicated by broken lines 615 and 625, the risk targets 450 and 460 exist. In such a state, the reporting control unit C13 reports a direction in which the risk target exists (the right diagonal rear and the left diagonal rear) by the stereophonic sound from the output unit SPK. According to the present example, it is possible to report a risk that the driver does not recognize from the viewpoint of improving traffic safety for a plurality of directions in which the risk targets exist.

Summary of Embodiments

Configuration 1. The reporting device according to the above embodiment is a reporting device (100) mounted on a vehicle (200), the reporting device including:
a recognition processing unit (C11) that recognizes an obstacle existing in front of the vehicle on the basis of information detected by a front detection unit (SN1) and a risk target existing at least diagonally behind the vehicle on the basis of information detected by a rear detection unit (SN2);
a sight line monitoring unit (C12) that determines whether or not a driver recognizes the obstacle or the risk target on the basis of an overlap between a sight line of the driver acquired on the basis of a captured image of the driver and the obstacle or the risk target; and
a reporting control unit (C13) that reports the existence of the obstacle or the risk target, wherein
the reporting control unit (C13) performs the reporting when the driver does not recognize the obstacle or the risk target on the basis of the determination of the sight line monitoring unit (C12).

According to the reporting device of the configuration 1, it is possible to report a risk that the driver does not recognize from the viewpoint of improving traffic safety.

Configuration 2. The reporting control unit (C13) performs the reporting when, on the basis of the determination of the sight line monitoring unit (C12), the driver recognizes the obstacle and the driver does not recognize the risk target.

According to the reporting device of the configuration 2, it is possible to report a risk that the driver does not recognize, and the reporting can be performed only when there is a high possibility that the driver changes the course. Therefore, it is possible to reduce troublesomeness due to excessive reporting.

Configuration 3. The reporting control unit (C13) performs the reporting when a relative distance between the obstacle and the vehicle becomes equal to or less than a threshold distance.

According to the reporting device of the configuration 3, the reporting can be performed only when the relative distance becomes equal to or less than the threshold distance and there is a high possibility that the driver changes the course while suppressing the reporting until the relative distance becomes equal to or less than the threshold distance, so that it is possible to reduce troublesomeness due to excessive reporting.

Configuration 4. The reporting control unit (C13) performs the reporting at a reporting level lower than a reporting level of the reporting or stops the reporting, when the driver recognizes the risk target by the determination (C12) of the sight line monitoring unit after the reporting.

According to the reporting device of the configuration 4, when the driver recognizes the risk target, there is a low possibility that the driver comes into contact with the risk target due to the change of the course, so that it is possible to reduce troublesomeness of reporting.

Configuration 5. The reporting control unit (C13) performs the reporting at a reporting level lower than a reporting level of the reporting or stops the reporting, when a braking operation by the driver is detected after the reporting.

According to the reporting device of the configuration 5, since there is a high possibility of stopping without changing the lane, it is possible to reduce troublesomeness of reporting.

Configuration 6. The reporting control unit (C13) performs the reporting at a reporting level higher than a reporting level of the reporting, when it is determined that the driver does not recognize the obstacle on the basis of the determination of the sight line monitoring unit.

According to the reporting device of the configuration 6, when reporting with higher urgency is required, the reporting is performed at a higher reporting level, so that it is possible to report a risk that the driver does not recognize.

Configuration 7. The reporting control unit (C13) causes an output unit to output a stereophonic sound and reports a direction in which the risk target exists.

According to the reporting device of the configuration 7, the driver can intuitively grasp the direction in which the risk target exists by performing the reporting using the stereophonic sound as the reporting sound.

Configuration 8. The reporting control unit (C13) reports a direction in which the risk target exists using the stereophonic sound from the output unit provided in a headrest of a driver seat on which the driver sits.

According to the reporting device of the configuration 8, by providing the output unit in the headrest at the position close to the driver's ear, a clearer reporting sound can be transmitted to the driver, and the driver can more clearly grasp the direction in which the risk target exists.

Configuration 9. The reporting control unit (C13) does not perform the reporting when the driver recognizes the obstacle as well as the risk target on the basis of the determination of the sight line monitoring unit (C12).

According to the reporting device of the configuration 9, it is possible to suppress the reporting on the risk recognized by the driver.

Configuration 10. The vehicle (200) according to the above embodiment includes the reporting device (100) having any one of the configurations 1 to 9.

According to the vehicle of the configuration 10, it is possible to provide a vehicle equipped with a reporting device capable of reporting a risk not recognized by the driver from the viewpoint of improving traffic safety.

Configuration 11. The reporting control method according to the above embodiment is a method for operating a reporting device (100) mounted on a vehicle, the reporting control method including:
a recognition processing step (S310, S320) of causing a recognition processing unit (C11) to recognize an obstacle existing in front of the vehicle on the basis of information detected by a front detection unit (SN1) and a risk target existing at least diagonally behind the vehicle on the basis of information detected by a rear detection unit (SN2);
a sight line monitoring step (S330) of causing a sight line monitoring unit (C12) to determine whether or not a driver recognizes the obstacle or the risk target on the basis of an overlap between a sight line of the driver acquired on the basis of a captured image of the driver and the obstacle or the risk target; and
a reporting control step (S340 to S370) of causing a reporting control unit (C13) to report the existence of the obstacle or the risk target, wherein
in the reporting control step, the reporting is performed when the driver does not recognize the obstacle or the risk target on the basis of the determination in the sight line monitoring step.

Configuration 11. According to the reporting control method, it is possible to report a risk that the driver does not recognize from the viewpoint of improving traffic safety.

Configuration 12. In the reporting control step, the reporting is performed when, on the basis of the determination in the sight line monitoring step, the driver recognizes the obstacle and the driver does not recognize the risk target.

According to the reporting control method of the configuration 12, a risk not recognized by the driver can be reported, and the reporting can be performed only when there is a high possibility that the driver changes the course, so that it is possible to reduce troublesomeness due to excessive reporting.

OTHER EMBODIMENTS

In the present invention, it is also possible to supply programs for realizing the functions of the above-described embodiments to a system or a reporting device constituting the system via a network or a storage medium, and one or more processors in a computer of the reporting device read the program to execute processing of the reporting device.

The invention is not limited to the foregoing embodiments, and various variations/changes are possible within the spirit of the invention.

What is claimed is:

1. A reporting device mounted on a vehicle, wherein the vehicle includes a camera disposed in a vehicle interior, the reporting device comprising:
at least one processor circuit with a memory comprising instructions, that when executed by the at least one processor circuit, cause the at least one processor circuit to at least:
recognize an obstacle existing in front of the vehicle on the basis of information detected by a front detection sensor and a risk target existing at least diagonally behind the vehicle on the basis of information detected by a rear detection sensor;
determine whether or not a driver recognizes the obstacle or the risk target on the basis of an overlap between a sight line of the driver acquired on the basis of appearance information of the driver captured by the camera and the obstacle or the risk target; and
report the existence of the obstacle or the risk target, wherein
the instructions, that when executed by the at least one processor circuit, further cause the at least one processor circuit to at least perform the reporting when the driver does not recognize the obstacle or the risk target on the basis of the determination, and perform the reporting at a reporting level lower than a reporting level of the reporting or stop the reporting, when a braking operation by the driver is detected after the reporting.

2. The reporting device according to claim 1, wherein the instructions, that when executed by the at least one processor circuit, further cause the at least one processor circuit to at least perform the reporting when, on the basis of the determination, the driver recognizes the obstacle and the driver does not recognize the risk target.

3. The reporting device according to claim 1, wherein the instructions, that when executed by the at least one processor circuit, further cause the at least one processor circuit to at least perform the reporting when a relative distance between the obstacle and the vehicle becomes equal to or less than a threshold distance.

4. The reporting device according to claim 1, wherein the instructions, that when executed by the at least one processor circuit, further cause the at least one processor circuit to at least perform the reporting at a reporting level lower than a reporting level of the reporting or stop the reporting, when the driver recognizes the risk target on the basis of the determination after the reporting.

5. The reporting device according to claim 2, wherein the instructions, that when executed by the at least one processor circuit, further cause the at least one processor circuit to at least perform the reporting at a reporting level higher than a reporting level of the reporting, when it is determined that the driver does not recognize the obstacle on the basis of the determination.

6. The reporting device according to claim 1, wherein the instructions, that when executed by the at least one processor circuit, further cause the at least one processor circuit to at least output a stereophonic sound from an output speaker and report a direction in which the risk target exists.

7. The reporting device according to claim 6, wherein the instructions, that when executed by the at least one processor circuit, cause the at least one processor circuit to at least report a direction in which the risk target exists using the stereophonic sound from the output speaker provided in a headrest of a driver seat on which the driver sits.

8. The reporting device according to claim 1, wherein the instructions, that when executed by the at least one processor circuit, cause the at least one processor circuit not to at least perform the reporting when, on the basis of the determination, the driver recognizes the obstacle as well as the risk target.

9. A vehicle comprising the reporting device according to claim 1.

10. A reporting control method for a reporting device mounted on a vehicle, wherein the vehicle includes a camera disposed in a vehicle interior, the method comprising:
recognizing an obstacle existing in front of the vehicle on the basis of information detected by a front detection sensor and a risk target existing at least diagonally behind the vehicle on the basis of information detected by a rear detection sensor;
determining whether or not a driver recognizes the obstacle or the risk target on the basis of an overlap between a sight line of the driver acquired on the basis of appearance information of the driver captured by the camera and the obstacle or the risk target; and
reporting the existence of the obstacle or the risk target, wherein
in the reporting, the reporting is performed when the driver does not recognize the obstacle or the risk target by the determination and the reporting is performed at a reporting level lower than a reporting level of the reporting or the reporting is stopped, when a braking operation by the driver is detected after the reporting.

11. The reporting control method according to claim 10, wherein in the reporting, the reporting is performed when the driver recognizes the obstacle by the determination and the driver does not recognize the risk target.

* * * * *